United States Patent
Kozma et al.

(10) Patent No.: US 10,897,512 B2
(45) Date of Patent: *Jan. 19, 2021

(54) GENERATING PUSH NOTIFICATIONS

(71) Applicant: International Business Machines Corporation, Armonk, NY (US)

(72) Inventors: Gabriel M. Kozma, Sao Paulo (BR); Carlos E. Seo, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 142 days.

This patent is subject to a terminal disclaimer.

(21) Appl. No.: 15/334,166

(22) Filed: Oct. 25, 2016

(65) Prior Publication Data

US 2017/0353569 A1 Dec. 7, 2017

Related U.S. Application Data

(63) Continuation of application No. 15/173,845, filed on Jun. 6, 2016.

(51) Int. Cl.
*G06F 15/16* (2006.01)
*H04L 29/08* (2006.01)
*H04L 29/06* (2006.01)

(52) U.S. Cl.
CPC .............. *H04L 67/26* (2013.01); *H04L 67/10* (2013.01); *H04L 67/42* (2013.01)

(58) Field of Classification Search
CPC ...... H04L 67/42; H04L 43/0817; H04L 67/26
USPC ........................................................ 709/217
See application file for complete search history.

(56) References Cited

U.S. PATENT DOCUMENTS

| | | | |
|---|---|---|---|
| 6,112,237 A | 8/2000 | Donaldson |
| 7,496,630 B2 | 2/2009 | Arellano et al. |
| 8,108,832 B2 | 1/2012 | Etelapera |
| 8,719,371 B1 | 5/2014 | Nerieri |

(Continued)

FOREIGN PATENT DOCUMENTS

JP 5852988 B2 2/2016

OTHER PUBLICATIONS

Ravenscraft, Eric, "Pushbullet Now Syncs All Your Notifications Across any Android Device", May 22, 2014, 2 pages, printed on Apr. 18, 2016, <http://lifehacker.com/pushbullet-now-syncs-all-your-notifications-across-any-1580214771>.

(Continued)

*Primary Examiner* — Oscar A Louie
*Assistant Examiner* — Oluwatosin M Gidado
(74) *Attorney, Agent, or Firm* — Stephen R. Yoder; David B. Woycechowsky

(57) ABSTRACT

A computer-implemented method includes identifying two or more user devices. Each of the two or more user devices are configured to receive push notifications. The method includes receiving a push notification request from a push notification server. The method responds to receiving the push notification request from the push notification server by determining whether at least one of the two or more user devices is active. The method responds to at least one of the two or more user devices being active by marking the active user devices as being an active user device. The method includes generating a push notification based on the push notification request. The method includes sending the push notification to the active user device.

10 Claims, 4 Drawing Sheets

(56) References Cited

U.S. PATENT DOCUMENTS

| | | | |
|---|---|---|---|
| 9,654,175 | B1 | 5/2017 | Lowrie |
| 9,798,817 | B1* | 10/2017 | Chau .................. G06F 16/9535 |
| 10,070,277 | B2 | 9/2018 | Keskitalo |
| 2003/0023690 | A1 | 1/2003 | Lohtia |
| 2006/0105739 | A1 | 5/2006 | Frank |
| 2010/0085972 | A1* | 4/2010 | Yan ......................... H04L 45/02 |
| | | | 370/392 |
| 2012/0198268 | A1* | 8/2012 | Qureshi ............. G06F 11/1443 |
| | | | 714/4.1 |
| 2013/0009684 | A1 | 1/2013 | Fujigaya |
| 2013/0084896 | A1* | 4/2013 | Barkie ................. H04W 12/02 |
| | | | 455/466 |
| 2013/0219272 | A1* | 8/2013 | Balasubramanian ... G06F 3/023 |
| | | | 715/704 |
| 2014/0032691 | A1* | 1/2014 | Barton .................... H04L 41/00 |
| | | | 709/206 |
| 2014/0149538 | A1 | 5/2014 | Deeter et al. |
| 2015/0007709 | A1 | 1/2015 | Ghosh |
| 2015/0253867 | A1 | 9/2015 | Lee |
| 2016/0007287 | A1 | 1/2016 | Sen |
| 2016/0063850 | A1 | 3/2016 | Yang |
| 2016/0104369 | A1* | 4/2016 | Szewczyk ............... G06F 16/33 |
| | | | 340/506 |
| 2016/0241605 | A1* | 8/2016 | Taboriskiy ............ H04W 76/10 |
| 2016/0301634 | A1* | 10/2016 | Allen ..................... H04L 51/14 |
| 2016/0301742 | A1 | 10/2016 | Lowery |
| 2016/0316034 | A1* | 10/2016 | Herrick .................. H04L 67/26 |
| 2017/0024484 | A1 | 1/2017 | Qiu |
| 2017/0064064 | A1* | 3/2017 | Kimura ............. H04M 1/72519 |
| 2017/0064631 | A1* | 3/2017 | Ayyagari .......... H04W 52/0251 |
| 2017/0119273 | A1 | 5/2017 | Thakur |
| 2017/0237815 | A1* | 8/2017 | Arsenault ............... H04W 4/70 |
| | | | 709/217 |
| 2018/0189235 | A1 | 7/2018 | Chan |

OTHER PUBLICATIONS

Remond, Mickael, "Google Cloud Messaging Update Boosted by XMPP", Posted on May 17, 2013, 8 pages, printed on Apr. 8, 2016, <https://blog.process-one.net/google-cloud-messaging-update-boosted-by-xmpp/>.

Weber, Dominik, "Notifications in a Multi-Device Environment", Diploma Thesis Nr. 3683, Institute for Visualization and Interactive Systems, University of Stuttgart, Completed: Jan. 15, 2015, 49 pages.

"How can we improve Discord—Only push notifications to the active device (if there is one)", Discord, 1 page, printed on Apr. 8, 2016, <https://feedback.discordapp.com/forums/326712-discord-dream-land/suggestions/11185578-only-push-notifications-to-the-active-device-if-t>.

"Notification Hubs Overview", Updated: Jun. 16, 2015, Microsoft, 5 pages, printed on Apr. 18, 2016, <https://msdn.microsoft.com/en-us/library/azure/jj927170.aspx>.

"Pushbullet connects your devices, making them feel like one", Pushbullet, 2 pages, printed on Apr. 8, 2016, <https://wvww.pushbullet.com/>.

Kozma et al., "Generating Push Notifications," U.S. Appl. No. 15/173,845, filed Jun. 6, 2016.

List of IBM Patents or Patent Applications Treated as Related, signed Oct. 25, 2016, 2 pages.

* cited by examiner

GENERATING PUSH NOTIFICATIONS

BACKGROUND

The present invention relates generally to the field of alert systems, and more particularly to push notification systems.

A push, or server push, describes a style of internet-based communication where the request for a given transaction is initiated by the publisher of the given transaction. For example, a social media platform may generate a notification, and publish the notification by sending (pushing) the notification to a client device. The notification may be presented as a pop-up alert, email, text message, or some other alert system.

SUMMARY

A computer-implemented method includes identifying two or more user devices. Each of the two or more user devices are configured to receive push notifications. The method includes receiving a push notification request from a push notification server. The method responds to receiving the push notification request from the push notification server by determining whether at least one of the two or more user devices is active. The method responds to at least one of the two or more user devices being active by marking the active user devices as being an active user device. The method includes generating a push notification based on the push notification request. The method includes sending the push notification to the active user device.

DETAILED DESCRIPTION

Figure 1:
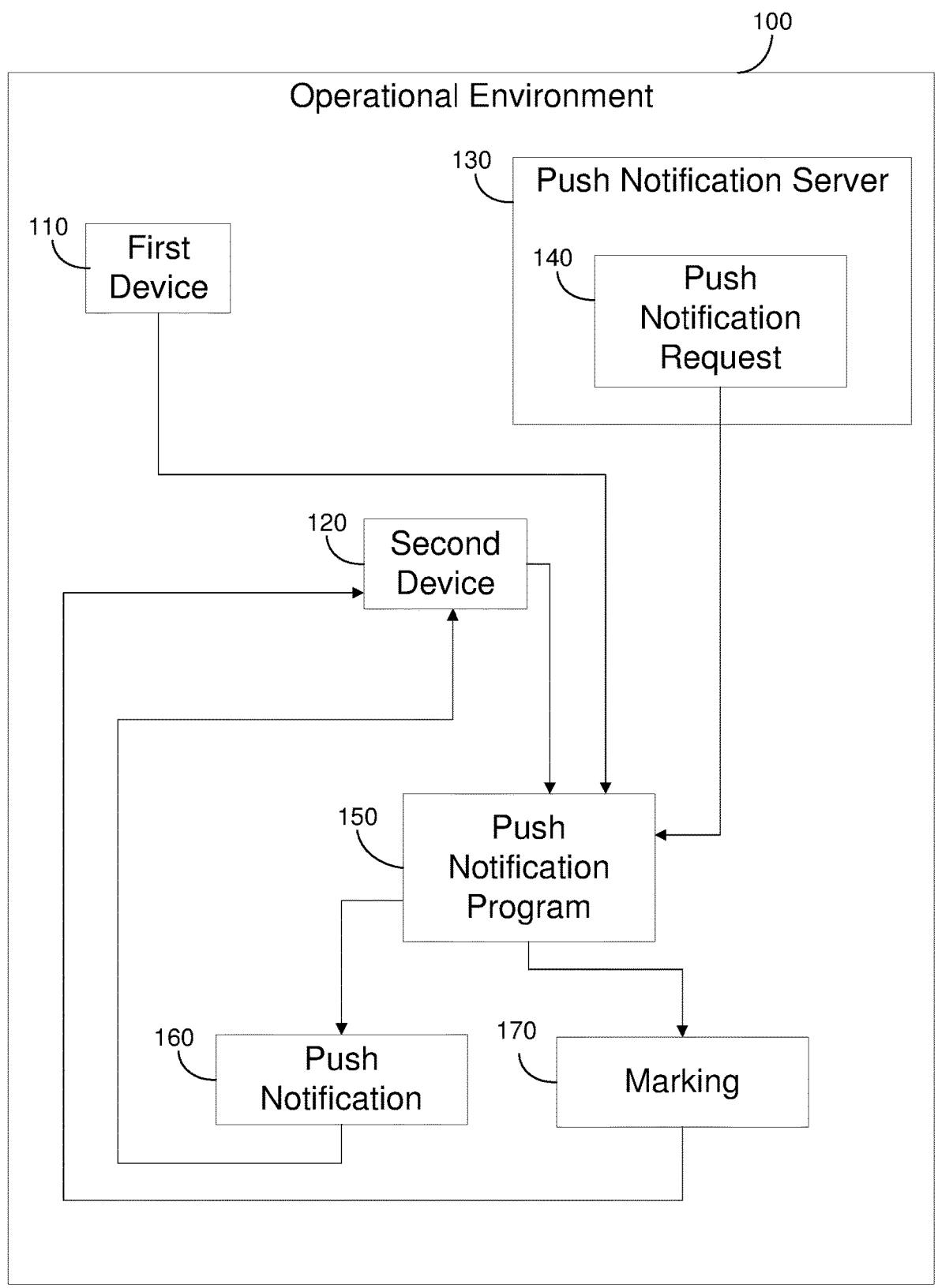
FIG. 1 is a block diagram of an operational environment suitable for operation of a push notification program, in accordance with at least one embodiment of the present invention.

Referring now to the invention in more detail, FIG. 1 is a block diagram displaying an exemplary operational environment suitable for operation of at least one embodiment of the invention. The operational environment 100 includes a first device 110, a second device 120, a push notification server 130, which includes a push notification request 140, a push notification program 150, a push notification 160, and marking 170, all in mutual communication and interconnected via the operational environment 100. The operational environment 100 may be a cloud-based, virtual, or distributed environment or a remote environment on defined server hardware, or, more generally, the operational environment 100 may be any type of environment suitable for access by the push notification server 130 of the push notification program 150.

The first device 110 and the second device 120 are devices capable of presenting alerts and notifications such as the push notification 160. The first device 110 and the second device 120 may be, for example, computing devices, devices within an alarm system, televisions, phones, and/or display devices. The first device 110 and the second device 120 are user devices. The receiver of a push notification may have more than one device that is capable of receiving the push notification, such as the first device 110 and the second device 120.

The push notification program 150 identifies the first device 110 and the second device 120. The push notification program 150 receives the push notification request 140 from the push notification server 130. The push notification program 150 generates the push notification 160 based on the push notification request 140. The push notification program 150 receives input from the first device 110 and the second device 120. The push notification program 150 generates the marking 170 based on input from the first device 110 and the second device 120. In the depicted embodiment, the push notification program 150 returns to marking 170 to the second device 120 and sends the push notification 160 to the second device 120. In other embodiments, the push notification program 150 may return markings, such as the marking 170 to other devices, such as the first device 110. In other embodiments, the push notification program 150 may send a push notification, such as the push notification 160, to other devices, such as the first device 110. In some embodiments, some functions (such as detecting activity or deciding to display the push notification 160) of the push notification program 150 run on the devices, such as the first device 110 and the second device 120 and other functions (such as deciding whether to send the push notification 160 or deciding whether to broadcast the notification) of the push notification program 150 runs on the push notification server 130. In some embodiments, the devices, such as the first device 110 and the second device 120 include the push notification program 150. In some embodiments, the push notification server 130 include the push notification program 150.

The push notification server 130 is a computer program or a device that provides functionality for other program or devices, such as the first device 110 and the second device 120. The push notification server 130 uses push technology. Push technology is a style of internet-based communication where a request for a given transaction or communication is initiated by the push notification server 130. The push notification server 130 includes the push notification request 140. The push notification request 140 is instructions or a set of instructions that enable the push notification program 150 to generate the push notification 160. The push notification server 130 may generate the push notification request 140 or receive the push notification request 140 from a separate client and/or server device. The push notification server 130 may be a server for a website, application, email service, and/or social media platform. In general, the push notification server 130 is a server that generates notifications and a push notification request, such as the push notification request 140.

The push notification 160 is a notification capable of being displayed via a device, such as the first device 110 or the second device 120. The first device 110 and the second device 120 are capable of receiving the push notification 160. The first device 110 and the second device 120 may present an alert and/or notification responsive to the push notification 160. For example, the push notification 160 may be a text message, an email, or an alert from an application. The push notification 160 may be displayed via a pop-up window. The push notification 160 may include instructions to display or not display an alert or notification on a device, such as the first device 110 or the second device 120. For example, the push notification 160 may be sent to both the first device 110 and the second device 120 but include instructions to only be displayed via the second device 120. The push notification program 150 may include such instructions with the push notification 160. In some embodiments, deciding to display the push notification 160 may be a function of the push notification program 150 that is run on a device, such as the first device 110 or the second device 120. In such an embodiment, deciding may be based on the current activity status of the device running the push notification program 150.

The push notification program 150 may generate the marking 170 responsive to input from a device, such as the first device 110 or the second device 120. The marking 170 may be an activity status for the first device 110 and/or the second device 120. For example, the marking 170 may be that the first device 110 is currently being used. In such an embodiment, the push notification program 150 may determine whether the first device 110 is being used based on receiving information from at least one input device selected from the group consisting of: an accelerometer, a gyroscope, a barometer, a touchscreen, one or more mechanical buttons, one or more capacitive buttons, a keyboard, a soft keyboard, a camera, a microphone, a light sensor, an operating system, and a power status.

The push notification program 150 may receive information from the input devices via the operational environment 100.

Figure 2:
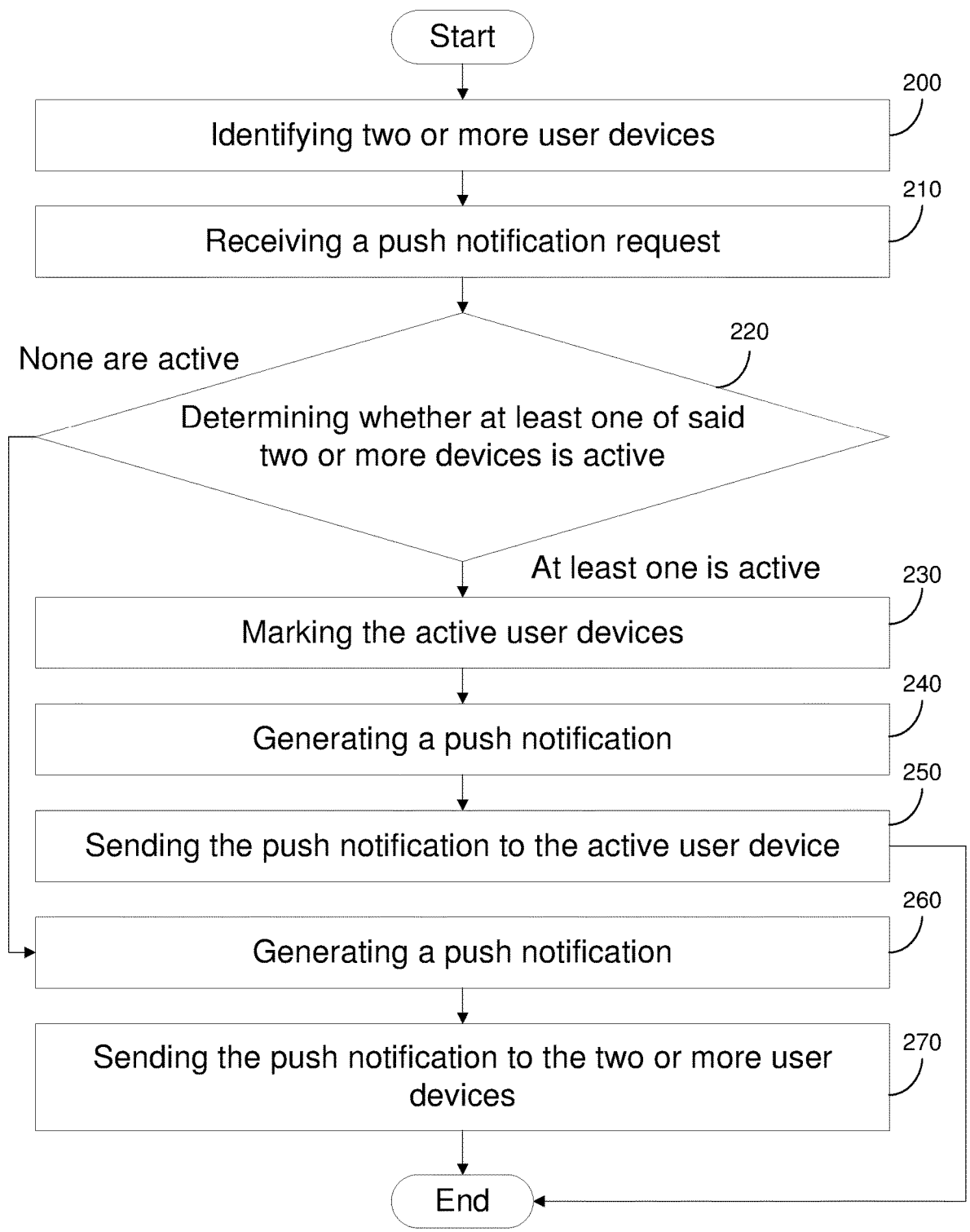
FIG. 2 is a flowchart depicting operational steps for a push notification program, in accordance with at least one embodiment of the present invention.

FIG. 2 is a flowchart depicting the operational steps of the push notification program 150 executing within the operational environment 100 of FIG. 1, in accordance with an embodiment of the present invention.

At step 200, the push notification program 150 identifies at least two devices, such as the first device 110 and the second device 120. Identifying may include a user explicitly calling the push notification program 150 from a command line interface using a reference to the first device 110 or the second device 120 as an argument. Alternatively, identifying may include automated calls to the push notification program 150, for example, from an integrated development environment or as part of a push notification management system.

At step 210, the push notification program 150 receives the push notification request 140 from the push notification server 130. Receiving may include a user explicitly calling the push notification program 150 from a command line interface using a reference to the push notification request as an argument. Alternatively, receiving may include automated calls to the push notification program 150, for example, from an integrated development environment or as part of a push notification management system or the push notification server 130.

At step 220, the push notification program 150 responds to receiving the push notification request 140 by determining whether at least one of the devices identified at step 200 is active. Determining whether at least one of the devices is active may include the push notification program 150 monitoring the first device 110 and the second device 120. For example, the push notification program 150 may receive input from the first device 110 and the second device 120 at regular intervals. The push notification program 150 may receive input from a device associate with the first device 110 and/or a feature of the first device 110 such as an accelerometer, a gyroscope, a barometer, a touchscreen, one or more mechanical buttons, one or more capacitive buttons, a keyboard, a soft keyboard, a camera, a microscope, and/or a light sensor. The push notification program 150 may receive input that a device associates with the first device 110 or a feature of the first device 110 is currently being used or has been used recently. The push notification program 150 may use input received from monitoring the first device 110 and the second device 120 to yield status data. Status data may include a type of activity, how long the activity has been taking place, or how long much time has passed since a certain type of activity began. For example, status data may include that a video has been streaming from a computer for two hours but that no other buttons or user input receiving features of the computer have been used in the past two hours.

The push notification program 150 may determine an activity status for the first device 110 and the second device 120 based on the status data. In some embodiments, the push notification program 150 may determine that a device's activity status is active if the device has been used previously within a certain timeframe. For example, if the device has been used within the past minute or hour. In other embodiments, the push notification program 150 may only determine that a device's activity status is active if the device has been used previously in a particular way within a certain timeframe. In such an embodiment, the push notification program 150 may consider certain types of activity to not be indicative of an activity status of active. For example, the push notification program 150 may consider video streaming to not be indicative of an active activity status.

If the push notification program 150 determines that at least one of the devices identified at step 200 is active, the push notification program 150 proceeds to step 230. At step 230, the push notification program 150 generates the marking 170 and marks the devices that were determined to be active at step 220 as being active. For example, the push notification program 150 may identify a device and receive input that a keyboard associated with the device is receiving input. The push notification program 150 may mark the device as being active with a marking, such as the marking 170.

At step 240, the push notification program 150 generates a push notification, such as the push notification 160. In some embodiments, the push notification 160 is generated responsive to, and following instructions from the push notification request 140 that was received at step 210.

At step 250, the push notification program 150 sends the push notification 160 to the devices that were marked active at step 230.

If at step 220, the push notification program 150 determines that none of the devices identified at step 200 are active the push notification program proceeds to step 260. At step 260, the push notification program 150 generates a push notification in a manner similar to step 240.

At step 270, the push notification program 150 sends the push notification 160 to every device that was identified at step 200.

Figure 3:
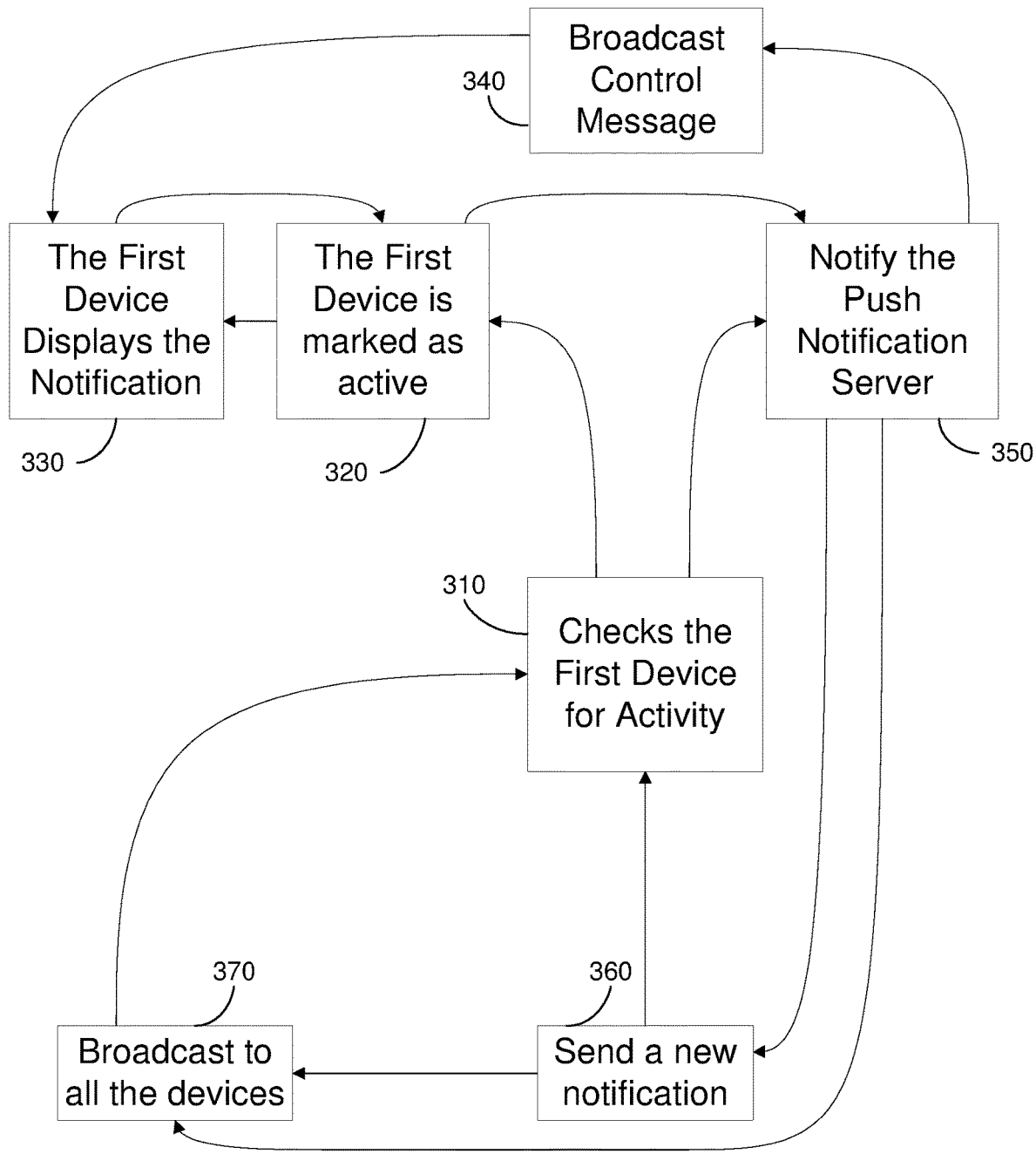
FIG. 3 is a flow diagram depicting operational steps for a push notification program as a state-machine, in accordance with at least one embodiment of the present invention.

FIG. 3 is a flowchart depicting operational steps for the push notification program 150 as a state-machine, in accordance with at least one embodiment of the present invention.

A state-machine is a mathematical model of computation used to design both computer programs and sequential logic circuits. A state-machine can be in one of a finite number of states. The state-machine is in only one state at a time, sometimes referred to as the current state. The state-machine can change from one state to another when initiated by a triggering event or conditions, sometimes referred to as a transition.

At step 300, the push notification program 150 determines whether a device, such as the first device 110, is active in a manner similar to step 220. If the first device 110 is active, the push notification program 150 proceeds to step 320. If the first device 110 is inactive, the push notification program 150 proceeds to step 350.

At step 320, the first device 110 is marked as active in a manner similar to step 230. After the push notification program 150 marks the first device 110 as active, the push notification program 150 proceeds to step 330 and displays the push notification 160 via the first device 110. If at step 330, there were previously no active devices the first device 110 may be marked, such as by the parking 170, as a current device. A marking of the first device 110 as current may be sent to the push notification server 130 and/or the push notification program 150.

If, at step 310 it is determined that the first device 110 is inactive, the push notification program 150 proceeds to step 350. At step 350 the push notification program 150 sends an inactivity status associated with the first device 110 to the push notification server 130. The push notification server 130 may have been receiving markings and/or status updates for other devices, such as the second device 120. If at step 350 none of the devices have an active status, the push notification program 150 proceeds to step 340. At step 340 the push notification program 150 broadcasts the push notification 160 via the push notification server 130 to all devices, such as the first device 110 and the second device 120, and displays the push notification 160 via all devices, in a manner similar to step 270. This includes the push notification program 150 proceeding to step 330 and displaying the push notification 160 via the first device 110.

If, at step 350, the most recently marked as current device was marked as inactive at step 310, the push notification program 150 proceeds to step 370. At step 370, the push notification program 150 broadcasts to each device and all devices, such as the first device 110 and the second device 120 will broadcast the push notification 160. The push notification program 150 then proceeds to step 310.

If, at step 350, a new push notification is received via the push notification server 130, the push notification program 150 proceeds to step 360. At step 360, the push notification program 150 sends the new notification responsive to whether or not one of the devices marked as current and inactive is receiving a new push notification for the first time or not. If, the device marked as current and inactive is receiving the new push notification for the first time the push notification program 150 proceeds to step 370. If, the device marked as current and inactive is not receiving a new push notification for the first time (for example, if this is a second or third time) the push notification program 150 only sends the new push notification to the device that is marked as current and inactive and proceeds to step 310.

Figure 4:
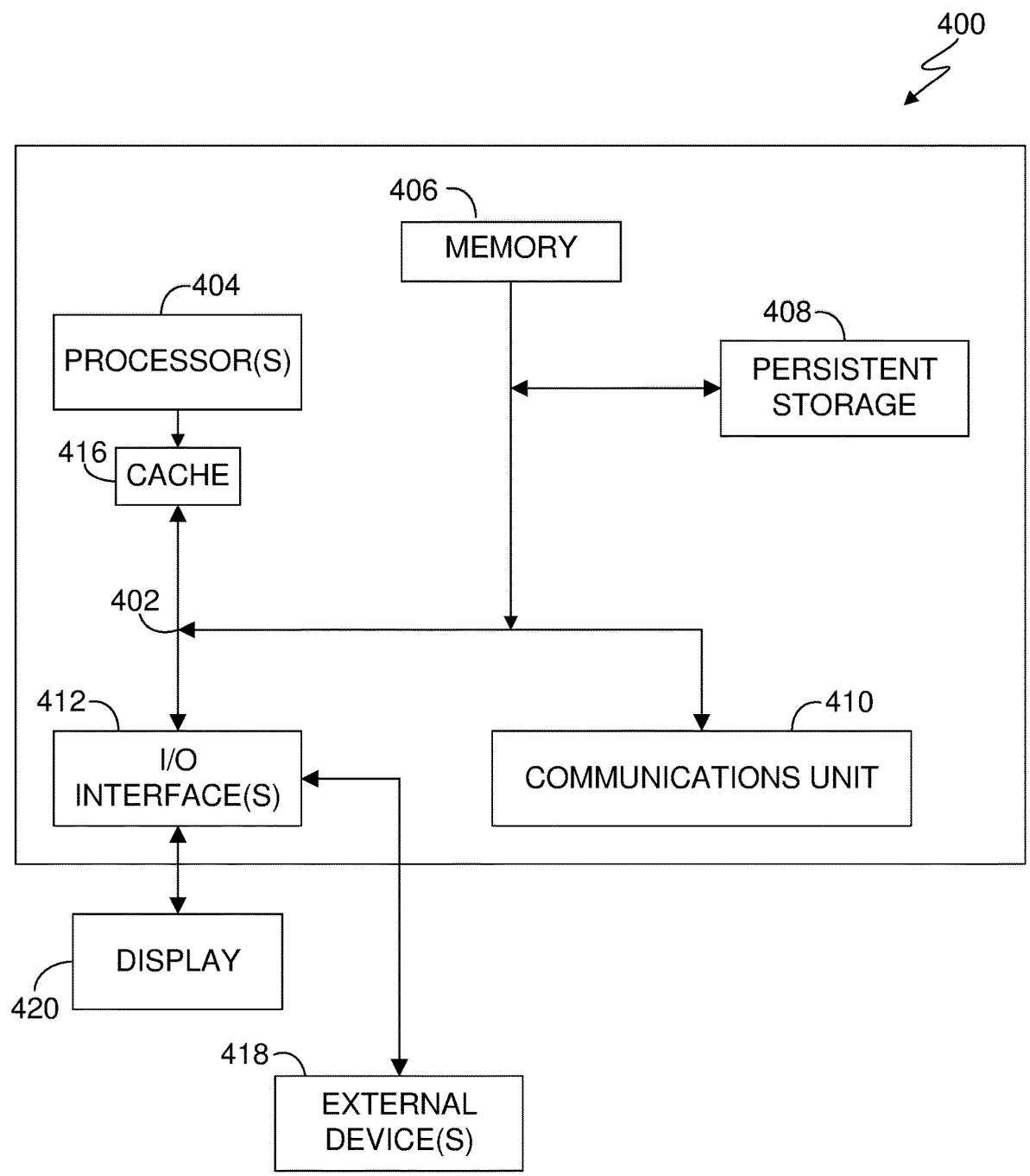
FIG. 4 is a block diagram of components of an operational apparatus suitable for executing a push notification program, in accordance with at least one embodiment of the present invention.

FIG. 4 is a block diagram depicting components of a computer 400 suitable for executing the push notification program 150. FIG. 4 displays the computer 400, the one or more processor(s) 404 (including one or more computer processors), the communications fabric 402, the memory 406, the RAM 416, the cache 416, the persistent storage 408, the communications unit 410, the I/O interfaces 412, the display 420, and the external devices 418. It should be appreciated that FIG. 4 provides only an illustration of one embodiment and does not imply any limitations with regard to the environments in which different embodiments may be implemented. Many modifications to the depicted environment may be made.

As depicted, the computer 400 operates over a communications fabric 402, which provides communications between the cache 416, the computer processor(s) 404, the memory 406, the persistent storage 408, the communications unit 410, and the input/output (I/O) interface(s) 412. The communications fabric 402 may be implemented with any architecture suitable for passing data and/or control information between the processors 404 (e.g., microprocessors, communications processors, and network processors, etc.), the memory 406, the external devices 418, and any other hardware components within a system. For example, the communications fabric 402 may be implemented with one or more buses or a crossbar switch.

The memory 406 and persistent storage 408 are computer readable storage media. In the depicted embodiment, the memory 406 includes a random access memory (RAM). In general, the memory 406 may include any suitable volatile or non-volatile implementations of one or more computer readable storage media. The cache 416 is a fast memory that enhances the performance of computer processor(s) 404 by holding recently accessed data, and data near accessed data, from memory 406.

Program instructions for the push notification program 150 may be stored in the persistent storage 408 or in memory 406, or more generally, any computer readable storage media, for execution by one or more of the respective computer processors 404 via the cache 416. The persistent storage 408 may include a magnetic hard disk drive. Alternatively, or in addition to a magnetic hard disk drive, the persistent storage 408 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of the persistent storage 408.

The communications unit 410, in these examples, provides for communications with other data processing systems or devices. In these examples, the communications unit 410 may include one or more network interface cards. The communications unit 410 may provide communications through the use of either or both physical and wireless communications links. The push notification program 150 may be downloaded to the persistent storage 408 through the communications unit 410. In the context of some embodiments of the present invention, the source of the various input data may be physically remote to the computer 400 such that the input data may be received and the output similarly transmitted via the communications unit 410.

The I/O interface(s) 412 allows for input and output of data with other devices that may operate in conjunction with the computer 400. For example, the I/O interface 412 may provide a connection to the external devices 418, which may include a keyboard, keypad, a touch screen, and/or some other suitable input devices. External devices 418 may also include portable computer readable storage media, for example, thumb drives, portable optical or magnetic disks, and memory cards. Software and data used to practice embodiments of the present invention may be stored on such portable computer readable storage media and may be loaded onto the persistent storage 408 via the I/O interface(s) 412. The I/O interface(s) 412 may similarly connect to a display 420. The display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product (CPP) comprising:
a non-transitory machine readable storage device; and
computer code stored on the non-transitory machine readable storage device, with the computer code including instructions and data for causing a processor(s) set to perform operations including the following:
receiving a first user device identification data set including information indicative of a plurality of computing devices of the first user,
receiving a request to push a first push notification to the first user,
determining that a first activity level status of a first sub-set of the plurality of computing devices of the first user is inactive based, at least in part, upon a first pre-defined type of user input,
responsive to the determination that the activity level status of the first sub-set of the plurality of computing devices is inactive, holding, by a push notification server, the first push notification to the first user,
subsequent to the hold of the first push notification, determining that a second activity level status of a second sub-set of the plurality of computing devices is active based, at least in part, upon a second pre-defined type of user input, and
responsive to the determination that the second activity level status is active, sending, by the push notification server, over a communication network, the push notification to the second sub-set of the plurality of computing devices.

2. The CPP of claim 1 further comprising:
for each computing device of the plurality of computing devices, determining whether the given computing device has an active status depending upon whether the given computing device has received user input from a user within a predetermined time range ending immediately prior to the determination of whether the given computing device has an active status, with the determination of whether the given computing device has an active status being based, at least in part, upon the pre-defined type of user input; and
responsive to the determination of which computing devices have active status, generating the activity level data set.

3. The CPP of claim 1 further comprising:
for each computing device of the plurality of computing devices, determining whether the given computing device has an active status depending upon whether the given computing device has been used by a user within a predetermined time range ending immediately prior to the determination of whether the given computing device has an active status, with video streaming not being considered as use of the given computing device; and
responsive to the determination of which computing devices have active status, generating the activity level data set.

4. The CPP of claim 1 further comprising:
for each computing device of the plurality of computing devices, determining whether the given computing device has an active status depending upon whether the given computing device has received user input from a user within a predetermined time range ending immediately prior to the determination of whether the given computing device has an active status; and
responsive to the determination of which computing devices have active status, generating the activity level data set;
wherein the determination of which computing devices are in active status is performed by a push notification program in the form of a state machine.

5. The CPP of claim 1 further comprising:
for each computing device of the plurality of computing devices, determining whether the given computing device has an active status depending upon whether the given computing device has received user input from a user within a predetermined time range ending immediately prior to the determination of whether the given computing device has an active status;
responsive to the determination of which computing devices have active status, generating the activity level data set;
receiving a first device user activity data set indicating that a first device, of the plurality of computing devices, has received user input from a user; and
responsive to the receipt of the first device user activity data set, marking the first device with a first marking;
wherein the determination of whether the first computing device is active is based upon the first marking.

6. A computer system (CS) comprising:
a processor(s) set;
a machine readable storage device; and
computer code stored on the machine readable storage device, with the computer code including instructions for causing the processor(s) set to perform operations including the following:
receiving a first user device identification data set including information indicative of a plurality of computing devices of the first user,
receiving a request to push a first push notification to the first user,
determining that a first activity level status of a first sub-set of the plurality of computing devices of the first user is inactive based, at least in part, upon a first pre-defined type of user input,
responsive to the determination that the activity level status of the first sub-set of the plurality of computing devices is inactive, holding, by a push notification server, the first push notification to the first user,
subsequent to the hold of the first push notification, determining that a second activity level status of a second sub-set of the plurality of computing devices is active based, at least in part, upon a second pre-defined type of user input, and
responsive to the determination that the second activity level status is active, sending, by the push notification server, over a communication network, the push notification to the second sub-set of the plurality of computing devices.

7. The CS of claim 6 further comprising:
for each computing device of the plurality of computing devices, determining whether the given computing device has an active status depending upon whether the given computing device has received user input from a user within a predetermined time range ending immediately prior to the determination of whether the given computing device has an active status, with the determination of whether the given computing device has an active status being based, at least in part, upon the pre-defined type of user input; and responsive to the determination of which computing devices have active status, generating the activity level data set.

8. The CS of claim 6 further comprising:

for each computing device of the plurality of computing devices, determining whether the given computing device has an active status depending upon whether the given computing device has been used by a user within a predetermined time range ending immediately prior to the determination of whether the given computing device has an active status, with video streaming not being considered as use of the given computing device; and responsive to the determination of which computing devices have active status, generating the activity level data set.

9. The CS of claim 6 further comprising:

for each computing device of the plurality of computing devices, determining whether the given computing device has an active status depending upon whether the given computing device has received user input from a user within a predetermined time range ending immediately prior to the determination of whether the given computing device has an active status; and responsive to the determination of which computing devices have active status, generating the activity level data set;

wherein the determination of which computing devices are in active status is performed by a push notification program in the form of a state machine.

10. The CS of claim 6 further comprising:

for each computing device of the plurality of computing devices, determining whether the given computing device has an active status depending upon whether the given computing device has received user input from a user within a predetermined time range ending immediately prior to the determination of whether the given computing device has an active status;

responsive to the determination of which computing devices have active status, generating the activity level data set;

receiving a first device user activity data set indicating that a first device, of the plurality of computing devices, has received user input from a user; and responsive to the receipt of the first device user activity data set, marking the first device with a first marking;

wherein the determination of whether the first computing device is active is based upon the first marking.

* * * * *